United States Patent [19]
Treece et al.

[11] Patent Number: 5,968,429
[45] Date of Patent: Oct. 19, 1999

[54] APPARATUS AND METHOD FOR MOLDING OF POLYESTER ARTICLES DIRECTLY FROM A MELT

[75] Inventors: Lanney Calvin Treece; Max Lamar Carroll, Jr.; Eric Gray Olsen, all of Kingsport, Tenn.

[73] Assignee: Eastman Chemical Company, Kingsport, Tenn.

[21] Appl. No.: 08/957,576

[22] Filed: Oct. 24, 1997

Related U.S. Application Data

[60] Provisional application No. 60/041,056, Mar. 20, 1997.

[51] Int. Cl.$^6$ .............................. B29C 47/38; B29C 47/76
[52] U.S. Cl. .............. 264/102; 264/211.21; 264/211.23; 264/297.2; 264/328.8; 264/328.19; 425/145; 425/203; 425/204; 425/207; 425/209; 425/559; 425/572; 425/588
[58] Field of Search ................................ 264/102, 211.21, 264/211.23, 297.2, 328.8, 328.19; 425/145, 203, 204, 207, 209, 559, 572, 588

[56] References Cited

U.S. PATENT DOCUMENTS

| | | |
|---|---|---|
| 3,050,533 | 8/1962 | Munro et al. . |
| 4,093,593 | 6/1978 | Go . |
| 4,330,661 | 5/1982 | Go . |
| 4,357,461 | 11/1982 | Go et al. . |
| 4,403,090 | 9/1983 | Smith . |
| 4,424,337 | 1/1984 | Smith et al. . |
| 4,447,595 | 5/1984 | Smith et al. . |
| 4,734,243 | 3/1988 | Kohama et al. . |
| 4,764,323 | 8/1988 | Al Ghatta . |
| 4,837,115 | 6/1989 | Igarashi et al. . |
| 5,049,647 | 9/1991 | Al-Ghatta . |
| 5,080,845 | 1/1992 | Herrmann et al. . |
| 5,104,965 | 4/1992 | Jenkins et al. . |
| 5,250,333 | 10/1993 | McNeely et al. . |
| 5,258,233 | 11/1993 | Mills et al. . |
| 5,266,413 | 11/1993 | Mills et al. . |
| 5,459,168 | 10/1995 | Nasr et al. . |
| 5,597,525 | 1/1997 | Koda et al. . |
| 5,597,891 | 1/1997 | Nelson et al. . |
| 5,656,221 | 8/1997 | Schumann et al. . |
| 5,656,719 | 8/1997 | Stibal et al. . |

FOREIGN PATENT DOCUMENTS

| | | |
|---|---|---|
| 254 321 | 12/1941 | Switzerland . |
| WO 93/23474 A1 | 11/1993 | WIPO . |
| WO 97/11829 A1 | 4/1997 | WIPO . |

OTHER PUBLICATIONS

Translation of Japan 7–164509 (Published Jun. 27, 1995).
Abstract of Japan 62–182065 (Published Jan. 26, 1989).
Patent Abstracts of Japan, vol. 095, No. 002, Mar. 31, 1995 & JP 06 305647 A (Takenaka Komuten Co. Ltd.), Nov. 1, 1994.

*Primary Examiner*—Leo B. Tentoni
*Attorney, Agent, or Firm*—Karen A. Harding, Esq.; Harry J. Gwinnell, Esq.

[57] ABSTRACT

The present invention relates to an apparatus and method for producing molded polyester articles. More particularly, the invention concerns an apparatus and method for continuously producing molded polyester articles having low acetaldehyde content from a melt prepared by continuously reacting polyester precursors. The polyester is prepared and formed into useful shaped articles in a single, integrated, continuous melt-to-mold process without an intermediate solidification of the melt.

21 Claims, 1 Drawing Sheet

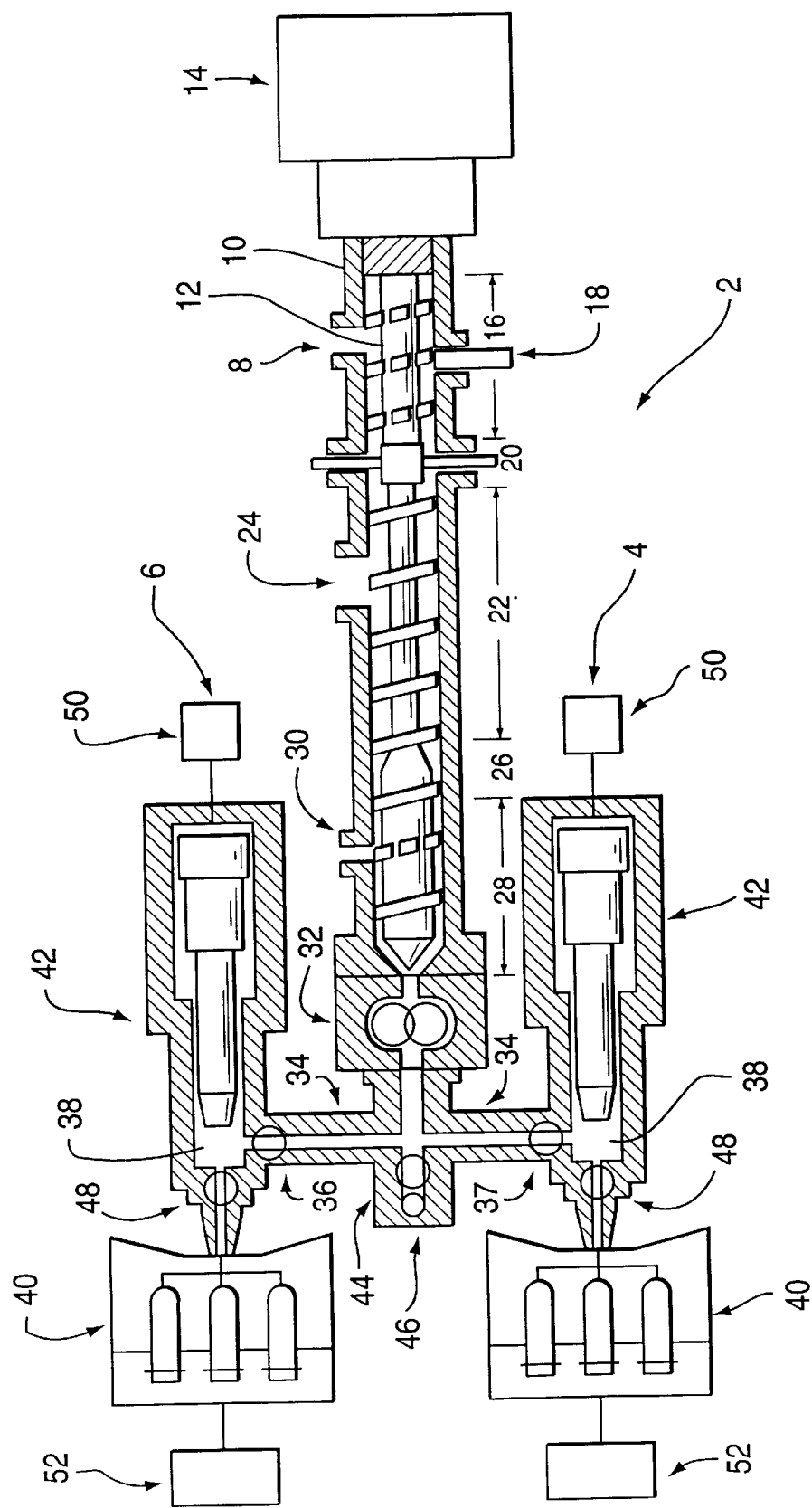

APPARATUS AND METHOD FOR MOLDING OF POLYESTER ARTICLES DIRECTLY FROM A MELT

RELATED APPLICATION

This application claims priority of provisional application Ser. No. 60/041,056 filed Mar. 20, 1997.

BACKGROUND OF THE INVENTION

1. Field of the Invention

The present invention relates to an apparatus and method for producing molded polyester articles. More particularly, the invention concerns an apparatus and method for continuously producing molded polyester articles having low acetaldehyde content from a melt prepared by continuously reacting polyester precursors. The polyester is prepared and formed into useful shaped articles in a single, integrated, continuous melt-to-mold process without an intermediate solidification of the melt.

2. Description of the Prior Art

It is known in the art that polyesters are widely used in the manufacture of molded objects, such as food and beverage containers. These polymers are generally made by batch or continuous melt phase polycondensation reactions as are well know in the art. The polymers are then pelletized and used in various extrusion or molding operations. During the preparation and processing of polyesters in the melt phase, certain by-products are formed. One such by-product is acetaldehyde, and its presence in molded food containers, beverage bottles, water bottles, and the like is quite deleterious. Particularly in the case of taste sensitive beverages such as cola, beer, and water, it is highly desirable to produce preforms having less than about 10 ppm of acetaldehyde. Achieving this low level of acetaldehyde is difficult because acetaldehyde is continually formed as a by-product during the polymerization and subsequent melt processing of polyethylene terephthalate (PET) and similar polymers.

The prior art has made various attempts to reduce the acetaldehyde content of molded polyester articles. A three stage process has been universally used to provide polyester polymers suitable for uses in applications where it is important to minimize the presence of acetaldehyde. Such a process typically involves the preparation of a relatively low molecular weight precursor polymer by melt phase polymerization techniques that are well known in the art. The acetaldehyde content of such a precursor may range from about 30 ppm to in excess of 150 ppm, depending on the reaction conditions chosen. This precursor is then cooled, shaped into pellets, crystallized, and subjected to further solid-state polymerization at a low temperature. Typically, an inert gas is used to strip glycols, acetaldehyde, and other reaction by-products from the pellets so that at the end of the solid-state process, the acetaldehyde content has been reduced to below about 1 ppm or less. The product so prepared must still be heated and melted in a third step in order to be formed into a useful shape, such as a beverage bottle preform, and this process typically causes an increase in acetaldehyde content of from less than 1 ppm in the pellets, up to about 5 to about 10 ppm or more in the shaped article. This dramatic increase in acetaldehyde occurs despite the fact that the molding process takes typically less than one or two minutes to complete.

U.S. Pat. No. 5,597,891 describes an improved process for lowering the acetaldehyde content of molten PET to levels suitable for direct use in articles for food packaging by using an inert gas purge to contact the molten polyester. U.S. Pat. No. 4,734,243 describes an injection molding machine for plastics provided with a plasticizing device which consecutively plasticizes material and feeds a plurality of injection devices in regular sequence. German Patent DE19505680 describes a process for the production of bottle preforms from a melt wherein an inert gas is admitted into the continuous flow of the polyester melt and the acetaldehyde content is reduced to below 10 ppm. German Application DE19503053 describes the direct production of molded packagings that impart no taste from thermoplastic polyesters using conventional catalysts. Inert gas is dispersed into the polyester melt immediately after leaving the reactor, and vacuum degassed just before the molding machine. The inert gas is dispersed by means of stationary pipeline mixers and degassing is accomplished in an enlarged pipe segment or flash vessel under vacuum with an optional stirrer. Also, a polyamide type acetaldehyde reducing agent is added near the inert gas feed point. Japan Application Hei 5-315154 describes a method and apparatus for water injection, dispersion, bubbling, and degassing whereby volatiles present in the said polymer are vaporized and removed. U.S. Pat. No. 5,080,845 describes a method of removing low molecular weight substances from polymeric materials by mixing a supercritical extraction gas into the molten polymer under pressure in an extruder, and then transferring the mixture to a second extruder operated under reduced pressure where the gas, along with the extracted impurities, are vented and the polymeric material substantially free from impurities is discharged. U.S. Pat. No. 5,459,168 describes a process for treating an impure thermoplastic polymer using an extrusion apparatus to remove low molecular weigh compounds. The extrusion apparatus has a heated housing, in which there is a first low pressure zone, a high pressure zone where a separating agent is introduced into the molten polymer; an extraction zone where part of the separating agent and low molecular weight compounds are removed; a second low pressure zone, where the remainder of the low molecular weight compounds and separating agents are removed; a final high pressure zone; and an extruder head through which the purified polymer is recovered. U.S. Pat. No. 5,597,525 describes a method for injection molding polyethylene terephthalate by employing a vent type injection unit as means for omitting preliminary drying of the resin. The unit does not develop a poor screw biting, and even when the molding material is an undried, uncrystallized or crystallized PET, it can feed a certain amount of the material at all times to injection mold a molded form such as a preform to produce a thin-wall container. This patent discusses the need to keep the temperature of the molten polymer at a minimum in order to minimize formation of additional AA.

It has now been found that an apparatus and method may be employed whereby polyesters such as PET and similar polymers may be prepared continuously in a melt and transferred to this apparatus where it is purified of excess acetaldehyde and other by-products, and molded directly from the melt into useful shaped articles such as beverage bottle preforms, having a low acetaldehyde content. Not only does the apparatus of the present invention avoid the costly additional steps of conventional processing, such as cooling, chopping, drying, crystallizng, sold-state polymerization, and remelting, but the shaped articles produced additionally have low acetaldehyde content, better color, less loss of molecular weight due to polymer breakdown, and the freedom from defects know as "bubbles" and "unmelts" which are sometimes formed during the conventional molding process.

SUMMARY OF THE INVENTION

The invention provides an apparatus for producing molded articles comprising:

A) an extruder, said extruder comprising
   a) a cylindrical barrel having a plurality of serially connected zones along the interior of the barrel; at least one screw shaft along the interior of the barrel through said zones; and means for turning the shaft;
   b) a molten thermoplastic polymer inlet and a gas injection port at a first mixing zone of the barrel; said first mixing zone having means for mixing a molten thermoplastic polymer and a gas therein under a pressure of from about 1000 to about 3000 psig to thereby form a mixture;
   c) means for causing a flow of the mixture through a pressure reduction zone to a degassing zone;
   d) a degassing zone capable of being maintained at subatmospheric pressure and having a vacuum gas vent capable of removing gas from the polymer and conveying degassed polymer to a second mixing zone;
   e) a second mixing zone having an inlet port, capable of mixing and conveying the polymer to an outlet of the barrel;
   f) pumping means at the outlet of the barrel for pumping the polymer to a molding device; and
B) at least one molding device in polymer flow communication with the pumping means for continuously receiving molten polymer from the pumping means and forming molded articles from the polymer.

The invention also provides a process for the continuous production of molded polyester articles which comprises:
   a) reacting polyester homopolymer or copolymer precursors in a reactor under conditions sufficient to produce a stream of molten polyester homopolymer or copolymer,
   b) mixing the stream of molten polyester with a stream of a gas which is substantially inert to the polyester under a pressure of from about 1000 to about 3000 psig to thereby form a mixture;
   c) reducing the pressure of the mixture to subatmospheric pressure thereby causing the mixture to foam, and thereafter separating the gas in the mixture from the polyester by means of a vacuum;
   d) blending the degassed polyester with an acetaldehyde reducing agent to form a blend;
   e) forming a solid molded article from the blend without solidifying the polyester prior to forming the solid molded article.

The invention also provides a process for the continuous production of molded polyester articles which comprises:
A) reacting polyester homopolymer or copolymer precursors in a reactor under conditions sufficient to produce a stream of molten polyester homopolymer or copolymer;
B) providing an extruder, said extruder comprising
   a) a cylindrical barrel having a plurality of serially connected zones along the interior of the barrel; at least one screw shaft along the interior of the barrel through said zones; and means for turning the shaft;
   b) a molten thermoplastic polymer inlet and a gas injection port at a first mixing zone of the barrel; said first mixing zone having means for mixing a molten thermoplastic polymer and a gas therein under a pressure of from about 1000 to about 3000 psig to thereby form a mixture;
   c) means for causing a flow of the mixture through a pressure reduction zone to a degassing zone;
   d) a degassing zone capable of being maintained at subatmospheric pressure and having a vacuum gas vent capable of removing gas from the polymer and conveying degassed polymer to a second mixing zone;
   e) a second mixing zone having an inlet port, capable of mixing and conveying the polymer to an outlet of the barrel;
   f) pumping means at the outlet of the barrel for pumping the polymer to a molding device;
C) continuously flowing the stream of molten polyester into the first mixing zone of the extruder without solidifying the polyester prior to entry into the extruder and mixing the stream of molten polyester with an injected stream of a gas which is substantially inert to the polyester to thereby form a mixure under a pressure of from about 1000 to about 3000 psig;
D) flowing the mixture through a pressure reduction zone to a degassing zone;
E) degassing the mixture in the degassing zone which is maintained at subatmospheric pressure and removing the gas from the polymer by means of vacuum gas vent;
F) mixing the degassed polymer with an acetaldehyde reducing agent in a second mixing zone;
G) conveying the polymer to an outlet of the barrel and pumping the polymer out of the barrel to a molding device; and
H) continuously forming molded articles from the polymer.

BRIEF DESCRIPTION OF THE DRAWINGS

FIG. 1 shows a perspective view of the apparatus according to the invention.

DETAILED DESCRIPTION OF THE PREFERRED EMBODIMENT

The invention concerns a method and apparatus for removing acetaldehyde from molten polymers, such as polyesters and most particularly polyethylene terephthalate (PET) polymers followed by direct injection molding to form articles having low levels (<10 ppm) of acetaldehyde.

In the practice of the present invention, a polyester composition is prepared which may be produced by condensing a dibasic acid, such as a dicarboxylic acid or a lower alkyl diester thereof with a glycol. Among the dicarboxylic acids and their lower alkyl diesters which may be employed to form a polyester are terephthalic; isophthalic; phthalic; naphthalene dicarboxylic; succinic; sebacic; adipic; azelaic; bibenzoic; the hexahydrophthalics, and bis-p-carboxyphenoxyethane. Highly useful naphthalene dicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 2,8-isomers may also be used. Dibasic acids may contain from about 2 to about 40 carbon atoms and include isophthalic, adipic, glutaric, azelaic, sebacic, fumaric, dimer, cis- or trans-1,4-cyclohexanedicarboxylic, the various isomers of naphthalenedicarboxylic acids and the like. Preferred dibasic acids include terephthalic acid, isophthalic acid, naphthalene dicarboxylic acid, cyclohexane dicarboxylic acid and mixtures thereof The dibasic acids may be used in acid form, acid anhydride form or as their esters such as the dimethyl esters. One or more of these acids and/or their lower alkyl diesters is reacted with one of more glycols which include glycols having from about 3 to about 10 carbon atoms and include ethylene glycol, propylene glycol, 1,3-propanediol, 1,4-butanediol, 1,6-hexanediol, diethylene glycol, 1,4-cyclohexanediol, 1,4-cyclohexanedimethanol, neopentyl glycol and the like. The 1,4-cyclohexanedimethanol may be in the cis or the trans form or as cis/trans mixtures. Preferred glycols include ethylene glycol, 1,4-cyclohexane dimethanol diethylene glycol and mixtures thereof Since one or more diesters may be reacted with one or more glycols, the polyester of this invention is not limited to homopolyesters but also includes mixed polyesters such as copolyesters as well as copolymers with other monomers.

Polymers that are particularly useful in this process include poly(ethylene terephthalate), poly(ethylene naphthalenedicarboxylate), and copolyesters containing up to about 50 mole % of modifying dibasic acids and/or glycols. Of the polyesters within the contemplation of this invention, preferred are those containing at least a major amount of polyethylene terephthalate, the most preferred are those containing at least 80 mol % terephthalic acid and 80 mol % ethylene glycol on a 200 mol % basis. Polyethylene terephthalate is formed from a polymer produced by the polymerization of bis-(2-hydroxyethyl) terephthalate which is itself formed as an intermediate by one of two different methods. One method for producing bis-(2-hydroxyethyl) terephthalate is by direct esterification of terephthalic acid with ethylene glycol as described in U.S. Pat. No. 3,050,533. In this method the by-product of the reaction is water which is distilled from the reaction product. A second method for producing bis-(2-hydroxyethyl) terephthalate is by transesterification of dialkyl ester of terephthalic acid, preferably dimethyl terephthalate, with ethylene glycol. Preferably, two molecular proportions of ethylene glycol react with one molecular proportion of the dialkyl terephthalate. More preferably, more than two molecular proportions of ethylene glycol per molecular proportion of the dialkyl terephthalate are used since under these conditions the initial transesterification reaction occurs more rapidly and completely. The transesterification reaction is conducted under conditions of elevated temperature. For example, a temperature in the range of from about the boiling temperature of the reaction mixture to as high as 250° C. may be used. The reaction can occur at atmospheric, sub-atmospheric or super-atmospheric pressure. A by-product of the transesterification reaction is an alkanol. For example, if dimethyl terephthalate is used, methanol is produced. The alkanol is then removed from the reaction product.

In order to increase the reaction rate, many known catalysts may be employed in the transesterification reaction. Typical polyesterification catalysts which may be used include titanium alkoxides, dibutyl tin dilaurate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present from the beginning of the reaction, or may be added at any convenient point in the process. After the intermediate bis-(2-hydroxyethyl) terephthalate has been produced, it may be converted to polyethylene terephthalate by heating at a temperature above the boiling point of the ethylene glycol or the reaction mixture under conditions effecting the removal of the glycol or water. The heating may occur at a temperature as high as 325° C., if desired. During heating, pressure is reduced so as to provide rapid distillation of the excess glycol or water. The final polyethylene terephthalate polymer may have an intrinsic viscosity, as measured in orthochlorophenol at 25° C., in excess of 0.3 deciliter per gram. More preferably, the intrinsic viscosity of the polymer ranges from about 0.4 to about 1.0 deciliter per gram, measured in orthochlorophenol at 25° C. Still more preferably, the polyethylene terephthalate employed in the present invention has an intrinsic viscosity of about 0.5 to about 0.7 deciliter per gram as measured in orthochlorophenol at 25° C. The thermoplastic polyester containing polymers of this invention have a preferred melting point in the range of from about 200° C. to about 330° C. or more preferably from about 220° C. to about 290° C. and most preferably from about 250° C. to about 275° C.

Suitable for use as comonomers in polyester copolymers are such components as ethers, esters and partial esters of acrylic and methacrylic acid and of aromatic and aliphatic polyols. The production of such copolymers is well known in the art.

Many different kinds of additives can be employed, depending on the nature of the desired properties in the finished article. Such additives may include, but are not limited to, colorants, anti-oxidants, acetaldehyde reducing agents, stabilizers, e.g. uv and heat stabilizers, impact modifiers, polymerization catalyst deactivators, melt-strength enhancers, chain extenders, antistatic agents, lubricants, nucleating agents, solvents, fillers, plasticizers and the like.

FIG. 1 shows a typical apparatus according to the invention. It comprises a devolatilizing extruder 2 and a plurality of molding devices 4 and 6. The devolatilization extruder portion of the apparatus is of the single screw or twin screw type as are well known in the art. Polyester precursors, preferably PET precursors are continuously reacted upstream and form a polymer melt. Molten PET polymer from upstream processing equipment, typically a polycondensation reactor, enters the barrel 10 of the devolatilization extruder portion 2 of the apparatus at inlet nozzle 8. Inside the barrel 10 is one or more screws 12 rotated at a fixed speed by a drive train or motor 14. Extruder 2 has a series of sections or zones as explained more fully hereinafter. The zones are characterized as having different pressures exerted on the polymer such as by varying the root diameter of the screw 12 or the inside diameter of barrel 10 in addition to the outside diameter of the screw.

Polymer enters the extruder at inlet nozzle 8 located at a first zone 16 of the extruder. The temperature of the polymer will be greater than the melting point of the polymer, preferably no more than about 10 to about 20° C. higher greater than the melting point of the polymer. The molten polymer may be pumped to nozzle 8 using an extruder, gear pump, or other suitable pumping device for transporting viscous fluids. The melt may optionally pass through a distribution system feeding parallel apparatuses and optional polymer filters. The inherent viscosity (IhV) of the polymer will generally be in the range of from about 0.5 to about 1.0. A preferred IhV range is from about 0.7 to about 0.9. As used herein, the term "IhV" refers to inherent viscosity of the polymer as determined by a solution of 0.5 gram of polymer dissolved in 100 ml of a mixture of phenol (60% by volume) and tetrachloroethane (40% by volume). The feed line to nozzle 8 should be such as to minimize residence time (preferably <5 min.), maintain the desired temperature without excessively hot wall temperatures, eliminate any dead pockets where polymer can accumulate and degrade, and convey the polymer under conditions of minimal shear. The polymer is mixed in section 16 with a gas which is inert, i.e. nonreactive with the polymer. Gas is injected into zone 16 by means of nozzle 18 and the gas and polymer are mixed in this zone 16 under a pressure of from about 1000 to about 3000 psig. Useful gases within the context of this invention non-exclusively include nitrogen, carbon dioxide, $C_1$ to $C_4$ hydrocarbons, dehumidified air, noble gases and mixures thereof. The gas is present in an amount sufficient to dissolve acetaldehyde present in the polymer melt for later removal. Inert gas flow rates are typically about 1.0 SCF/lb or polymer or less and rates of about 0.25 SCF/lb or less are preferred. The gas injection nozzle should be designed so that many small, rather than a few large, bubbles are formed. The design of injection nozzles for the purpose of dispersing gases is well known in the art. The screw in this zone should be designed to cause further breakup of these bubbles, and dispersion into the molten polymer.

The mixture of polymer and gas then travels through a pressure reduction zone 20 where the molten polymer transitions from a region of high pressure, i.e. about 1000–3000 psig in zone 16 to a region of low pressure <10 mmHg and preferably <1 mmHg at a degassing zone 22. At pressure reduction zone 20 the flow of the polymer is restricted by known means including, but not limited to, a variable flow area type barrel valve arrangement, reverse pumping screw flights, or a fixed flow restriction blister ring arrangement. The application and use of these flow restricting methods is well known in the art of extruder design.

The pressure reduction creates a melt foam under conditions of reduced pressure in a partially filled and vented degassing section 22. In zone 22, the open area bound by the barrel wall and screw(s) is considerably expanded by a combination of increasing the depth of the screw flight or barrel/screw diameter. This zone is equipped with a vent nozzle 24 attached to a vacuum pump so that the pressure in this zone can be maintained at pressures <10 mmHg and preferably <1 mmHg. As the molten polymer passes through the restriction zone 20, the gas bubbles expand to create a less dense, foamed polymer/gas phase. The open area in zone 22 should be such that the foam does not completely fill the free volume bound by the barrel wall and screw(s). Typically the fraction of the free volume occupied by the foam should not exceed 50–70%. Once formed, this foam is transported down the barrel with a residence time in zone 22 typically being about 1 minute or less, to provide adequate time for dissolved acetaldehyde to diffuse out of the molten polymer phase and into the gas phase.

A compression zone 26 compresses out substantially any remaining gas bubbles to form a continuous melt phase devoid of all gas bubbles. As the foamed polymer is transported through this zone 26 of decreasing open area, the foamed polymer first fills the free volume bounded by the barrel wall and screw(s) then gas bubbles are forced out of molten polymer as the free volume becomes progressively smaller. At the end of this zone, the molten phase polymer substantially completely fills the free volume bounded by the screw(s) and barrel wall and is substantially devoid of any gas bubbles.

Inert gas containing devolatilized acetaldehyde is vented out of the barrel 10 through nozzle 24. The design of screws for efficiently conveying foamed melts and venting under conditions of partial filling of the barrel is well known in the art of extruder design. Downstream to zone 26, is a zone 28 where the barrel open area is essentially constant and the molten polymer is transported to the suction of a pump 32. The pressure in this zone 28 increases somewhat to about 200 to 400 psig due to the pumping action of the rotating screw. This zone is also equipped with a nozzle 30 through which an acetaldehyde reducing agent can be fed. Addition and mixing in of an acetaldehyde reducing agent to the melt serves to scavenge any acetaldehyde formed downstream to the vented screw section 22. This acetaldehyde reducing agent will typically be metered in as a molten resin using a feed gear pump. The rate of addition will typically be at a ratio of <0.5 lb. of additive/100 lb. of polymer throughput. The amount of the acetaldehyde reducing agent should be minimized such that only the amount required to scavenge acetaldehyde formed downstream to the vented devolatilization section 22 is fed. Suitable acetaldehyde reducing agents includes but are not limited to polyamides such as those disclosed in U.S. Pat. Nos. 5,266,413; 5,258,233 and 4,8837,115; polyesteramides; nylon-6 and other aliphatic polyamides such as those disclosed in Japan Patent Application Sho 62182065 (1987); ethylenediaminetetraacetic acid as disclosed in U.S. Pat. No. 4,357,461, alkoxylated polyols as disclosed in U.S. Pat. No. 5,250,333, bis(4-β-hydroxyethoxyphenyl)sulfone as disclosed in U.S. Pat. No. 4,330,661, zeolite compounds as disclosed in U.S. Pat. No. 5,104,965; 5-hydroxyisophthalic acid as disclosed in U.S. Pat. No. 4,093,593; poly(ethylene isophthalate) as disclosed in U.S. Pat. No. 4,403,090, supercritical carbon dioxide as disclosed in U.S. Pat. Nos. 5,049,647 and 4,764,323) and protonic acid catalysts as disclosed in U.S. Pat. Nos. 4,447, 595 and 4,424,337. Preferred acetaldehyde reducing agents include polyesteramides and aliphatic polyester amides. A screw section 28 should be designed to thoroughly mix the additive with the polymer. Residence time in this section 28 should typically be about 20 seconds or less. The design of screws for mixing in a molten additive is well know in the art of extruder design. The screw should be designed to minimize excessive shear and the barrel heating arrangement and control should be designed to minimize excessive wall temperatures and provide uniform heating. The total residence time in the extruder should not exceed a total of about 2 minutes.

A pump 32 which is preferably a rotary gear pump, is located at the end of zone 28. The purpose of the gear pump 32 is to provide adequate pressure to force the polymer through flow channels 34 leading to one or more molding devices such as those generally show by 4 and 6. Typical pressures at the discharge of the gear pump should be in the range of about 1000–3000 psig. Use of the gear pump in lieu of a screw pumping zone at the end of the devolatilization extruder screw offers the advantage of reduced residence time and less shear heating of the polymer. Also, the pumping rate can be maintained uniformly without changing the screw speed that should normally be operated at a constant speed and set to maintain good foaming and high acetaldehyde devolatilization efficiency.

Polymer exiting gear pump 32 flows through channels 34 via shutoff valves 36 and 37 and continuously pump the melt to alternately fill two accumulator reservoirs 38 of molding devices 4 and 6, thus filling and accumulating a shot for injection into their associated molds 40 by injectors 42. The flow channels 34 from the gear pump 32 discharge polymer into accumulator reservoirs 38 such that the residence time of the polymer is minimal, preferably about 30 seconds or less. These channels 34 are preferably uniformly heated and maintained at a temperature not exceeding the polymer melting temperature by more than about 20° C. and designed such that there are no "dead" pockets for polymer to accumulate and degrade. Inclusion of a purge valve 44 with discharge at opening 46 is desirable for startup, shutdown, and during process upsets.

During filling of the reservoir 38 of molding device 6, shutoff valve 36 is open and the shutoff valve 37 associated with the molding apparatus 4 is closed. Also, the shutoff valve 48 to the mold is closed. During filling, the ram piston 42 retracts due to pressure generated by the gear pump, thus expanding reservoir 38. Once a full shot is accumulated in reservoir 38, the shutoff valve 36 to molding device 6 closes and the shutoff valve 37 associated with molding device 4 opens, thus directing polymer flow to start filling reservoir 38 of molding device 4. Once the shutoff valve 36 is closed, the shutoff valve 48 to the mold of device 6 opens and the injection ram 42 moves forward under hydraulic pressure from the hydraulic injection unit 50 to inject the molten polymer into mold 40. Valve 48 will remain open with the ram in the forward position for a short time period, typically less than about 10 seconds, to permit cooling and solidification of the polymer in the mold. After this time has elapsed, valve 48 closes. After the elapse of additional mold cooling time typically from about 5 to about 15 seconds, the mold of device 6 will be opened by a clamping mechanism 52, the molded parts ejected, the mold reclosed, and hydraulic pressure applied to hold the mold in the closed position. During injection, mold cooling, and parts ejection at molding device 6, filling of the reservoir 38 and retraction of the ram piston 42 occurs at molding device 4. Once a full shot is accumulated at molding device 4, the shutoff valve 37 closes and the shutoff valve 36 at position reopens. Injection, mold cooling, and parts ejection occurs at molding device 4 as described for molding device 6 while refilling of the reservoir for molding device 6 occurs. A central controller associated with the molding machine sequences all the steps described above. Details for the design and operation of the molds, hydraulic clamps, and injection rams are well known in the art of molding machine design.

This apparatus offers the capability in one compact unit to receive the continuous flow of molten polyester typically discharged from a final polymerization reactor, efficiently remove acetaldehyde to low levels using inert gas foaming and stripping, efficiently scavenge any remaining acetaldehyde, and rapidly mold shaped articles. The concentration of acetaldehyde in the final molded articles will typically be less than 5 ppm and preferably less than 3 ppm.

What is claimed is:

1. An apparatus for producing molded articles comprising:
   A) an extruder, said extruder comprising
      a) a cylindrical barrel having a plurality of serially connected zones along the interior of the barrel; at least one screw shaft along the interior of the barrel through said zones; and means for turning the shaft;
      b) a molten thermoplastic polymer inlet and a gas injection port at a first mixing zone of the barrel; said first mixing zone having means for mixing a molten thermoplastic polymer and a gas therein under a pressure of from about 1000 to about 3000 psig to thereby form a mixture;
      c) means for causing a flow of the mixture through a pressure reduction zone to a degassing zone;
      d) a degassing zone capable of being maintained at subatmospheric pressure and having a vacuum gas vent capable of removing gas from the polymer and conveying degassed polymer to a second mixing zone;
      e) a second mixing zone having an inlet port, capable of mixing and conveying the polymer to an outlet of the barrel;
      f) pumping means at the outlet of the barrel for pumping the polymer to a molding device; and
   B) at least one molding device in polymer flow communication with the pumping means for continuously receiving molten polymer from the pumping means and forming molded articles from the polymer.

2. The apparatus of claim 1 wherein the pumping means comprises a gear pump mounted at the outlet of the barrel.

3. The apparatus of claim 1 further comprising a flow control valve positioned between the pumping means and each molding device.

4. The apparatus of claim 1 comprising a plurality of molding devices in polymer flow communication with the pumping means for continuously receiving molten polymer from the pumping means and forming molded articles from the polymer.

5. The apparatus of claim 1 wherein each molding device comprises a mold; an accumulator reservoir for receiving molten polymer from the pumping means; and a ram for injecting molten polymer from the accumulator reservoir to the mold.

6. The apparatus of claim 5 further comprising a flow control valve positioned between the accumulator reservoir and the mold.

7. The apparatus of claim 1 comprising a plurality of molding devices in polymer flow communication with the pumping means for continuously receiving molten polymer from the pumping means and forming molded articles from the polymer, wherein the pumping means comprises a gear pump mounted at the outlet of the barrel; a plurality of flow control valves, one flow control valve positioned between the pumping means and each molding device; wherein each molding device comprises a mold, an accumulator reservoir for receiving molten polymer from the pumping means, a ram for injecting molten polymer from the accumulator reservoir to the mold; and a flow control valve positioned between the accumulator reservoir and the mold.

8. A process for the continuous production of molded polyester articles which comprises:
   a) reacting polyester homopolymer or copolymer precursors in a reactor under conditions sufficient to produce a stream of molten polyester homopolymer or copolymer;
   b) mixing the stream of molten polyester with a stream of a gas which is substantially inert to the polyester under a pressure of from about 1000 to about 3000 psig to thereby form a mixture;
   c) reducing the pressure of the mixure to subatmospheric pressure thereby causing the mixture to foam, and thereafter separating the gas in the mixture from the polyester by means of a vacuum;
   d) blending the degassed polyester with an acetaldehyde reducing agent to form a blend;
   e) forming a solid molded article from the blend without solidifying the polyester prior to forming the solid molded article.

9. A process for the continuous production of molded polyester articles which comprises:
   A) reacting polyester homopolymer or copolymer precursors in a reactor under conditions sufficient to produce a stream of molten polyester homopolymer or copolymer;
   B) providing an extruder, said extruder comprising
      a) a cylindrical barrel having a plurality of serially connected zones along the interior of the barrel; at least one screw shaft along the interior of the barrel through said zones; and means for turning the shaft;
      b) a molten thermoplastic polymer inlet and a gas injection port at a first mixing zone of the barrel; said first mixing zone having means for mixing a molten thermoplastic polymer and a gas therein under a pressure of from about 1000 to about 3000 psig to thereby form a mixture;

c) means for causing a flow of the mixture through a pressure reduction zone to a degassing zone;

d) a degassing zone capable of being maintained at subatmospheric pressure and having a vacuum gas vent capable of removing gas from the polymer and conveying degassed polymer to a second mixing zone;

e) a second mixing zone having an inlet port, capable of mixing and conveying the polymer to an outlet of the barrel;

f) pumping means at the outlet of the barrel for pumping the polymer to a molding device;

C) continuously flowing the stream of molten polyester into the first mixing zone of the extruder without solidifying the polyester prior to entry into the extruder and mixing the stream of molten polyester with an injected stream of a gas which is substantially inert to the polyester to thereby form a mixture under a pressure of from about 1000 to about 3000 psig;

D) flowing the mixture through a pressure reduction zone to a degassing zone;

E) degassing the mixture in the degassing zone which is maintained at subatmospheric pressure and removing the gas from the polymer by means of vacuum gas vent;

F) mixing the degassed polymer with an acetaldehyde reducing agent in a second mixing zone;

G) conveying the polymer to an outlet of the barrel and pumping the polymer out of the barrel to a molding device; and H) continuously forming molded articles from the polymer.

10. The process of claim 9 wherein the pumping means comprises a gear pump mounted at the outlet of the barrel.

11. The process of claim 9 further comprising a flow control valve positioned between the pumping means and each molding device.

12. The process of claim 9 comprising a plurality of molding devices in polymer flow communication with the pumping means for continuously receiving molten polymer from the pumping means and forming molded articles from the polymer.

13. The process of claim 9 wherein each molding device comprises a mold; an accumulator reservoir for receiving molten polymer from the pumping means; and a ram for injecting molten polymer from the accumulator reservoir to the mold.

14. The process of claim 13 further comprising a flow control valve positioned between the accumulator reservoir and the mold.

15. The process of claim 9 comprising a plurality of molding devices in polymer flow communication with the pumping means for continuously receiving molten polymer from the pumping means and forming molded articles from the polymer, wherein the pumping means comprises a gear pump mounted at the outlet of the barrel; a plurality of flow control valves, one flow control valve positioned between the pumping means and each molding device; wherein each molding device comprises a mold, an accumulator reservoir for receiving molten polymer from the pumping means, a ram for injecting molten polymer from the accumulator reservoir to the mold; and a flow control valve positioned between the accumulator reservoir and the mold.

16. The process of claim 9 wherein the reduced pressure of step (E) is less than about 100 mmHg.

17. The process of claim 9 wherein the degassed polymer resulting from step (E) is substantially free of the inert gas and acetaldehyde.

18. The process of claim 9 wherein the acetaldehyde reducing agent is selected from the group consisting of polyamides; polyesteramides; ethylenediaminetetraacetic acid alkoxylated polyols, bis(4-β-hydroxyethoxyphenyl) sulfone, zeolite compounds, 5-hydroxyisophthalic acid, poly (ethylene isophthalate), supercritical carbon dioxide and protonic acid catalysts.

19. The process of claim 15 wherein molded articles are formed by conveying the polymer sequentially to each molding device one at a time while polymer is shutoff by the flow control valves to other molding devices.

20. The process of claim 9 wherein the molten polyester is maintained at a temperature that is no more than about 20° C. above the melting point of the polyester.

21. The process of claim 9 wherein the formed molding articles have an acetaldehyde concentration of no more than about 5 ppm based on the weight of the article.

* * * * *